Figure 1:
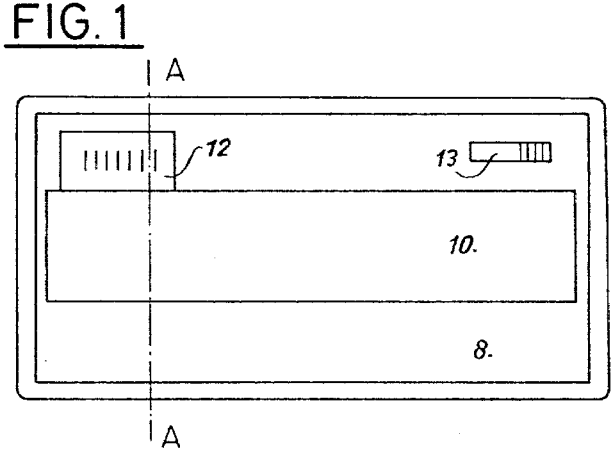

United States Patent [19]

Birukoff

[11] 4,345,844

[45] Aug. 24, 1982

[54] CALORIMETER

[76] Inventor: Marcel Birukoff, 10, route de la Gare, 1806 Saint-Legier, Vaud, Switzerland

[21] Appl. No.: 145,816

[22] Filed: May 1, 1980

[30] Foreign Application Priority Data

May 9, 1979 [CH] Switzerland ............ 4334/79

[51] Int. Cl.³ ............................................ G01K 17/00
[52] U.S. Cl. ..................................................... 374/31
[58] Field of Search ............. 73/190 R, 190 H, 193 R, 73/193 A, 1 F, 15 R; 374/31

[56] References Cited

U.S. PATENT DOCUMENTS

| | | | |
|---|---|---|---|
| 2,707,881 | 5/1955 | Gier et al. | 73/190 H |
| 2,785,860 | 3/1957 | Harrison et al. | 73/190 H |

FOREIGN PATENT DOCUMENTS 1298304  6/1969  Fed. Rep. of Germany ... 73/190 H

Primary Examiner—Donald O. Woodiel
Attorney, Agent, or Firm—Young & Thompson

[57] ABSTRACT

A calorimeter for measuring the quantity of heat flowing through a solid surface, comprises a heat insulated chamber having a recess of predetermined volume, to be placed against the surface whose heat flow is to be measured. Within the recess is a thermometer. The thermometer measures the initial temperature of the recess when the device is applied to the surface whose heat flow is to be measured, and also the final temperature of the recess after a predetermined period of time. Having regard for the temperature change during the elapsed time, and the volume of the chamber, the heat flow through the surface to which the device is applied can be calculated and displayed.

1 Claim, 2 Drawing Figures

CALORIMETER

The present invention is a portable measuring device permitting the measurement of the heat calories flowing through materials. As advantageously contrasted over devices known heretofore, it is simple in operation and yields reliable measuring values in a short measuring time.

The measuring device according to the present invention is utilized, above all, for being able to determine the thermal insulation values of structural components of rooms and buildings. These are important for determining or controlling the heat consumption and the heating power in all types of space-heating arrangements. It is also possible to measure heat or cold losses in apparatus and machinery. The measuring object can be composed of a single, solid material, or of various materials, it being possible also for gaseous or liquid components to be enclosed therein.

By means of the measuring device according to the present invention, the cooling off or heating up of the medium, in most cases air, which is in contact with the object to be measured and has a specific volume, is measured during a specific time interval. The temperature loss or the temperature increase of the medium in the measuring volume yields a basis for calculating the heat flow passing through the measuring area. The measuring time must be so short that the stored heat in the adjoining area and around the measuring device does not exert any substantial influence on the measurement result.

FIG. 1 of the drawing shows a front view of the calorimeter in one possible embodiment.

Figure 2:
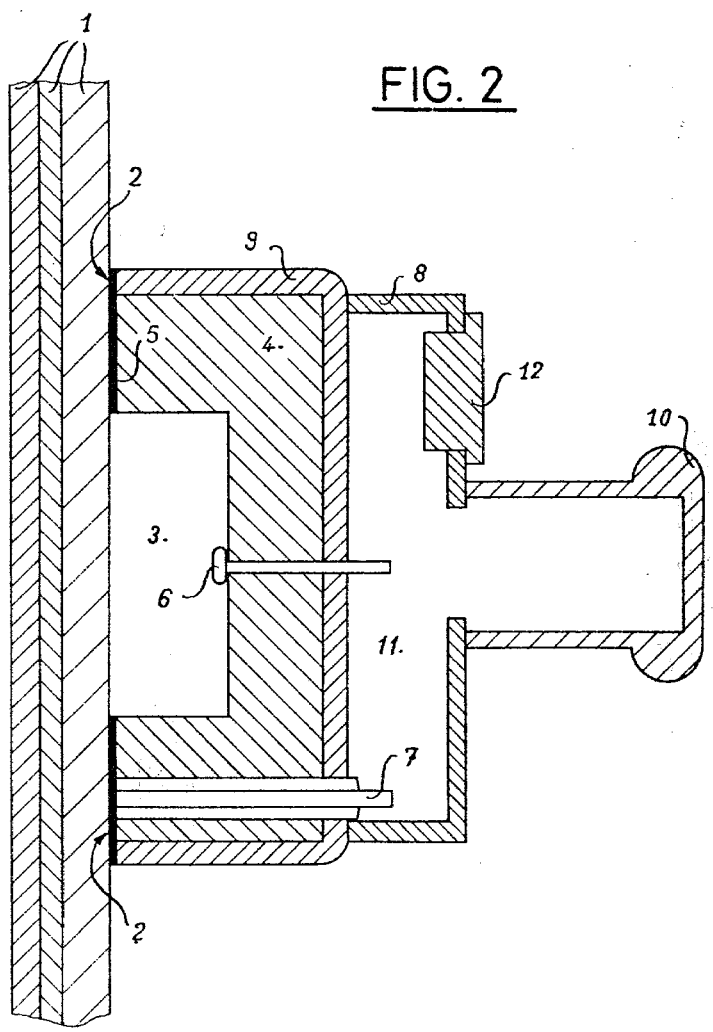

FIG. 2 of the drawing shows a sectional view of the calorimeter on the line A—A of FIG. 1 while in contact with an object to be measured.

The measuring device of this invention consists essentially of the thermally insulated measuring chamber 3 which is pressed against the object 1 to be measured, the measuring volume thereof being, in this way, sealed against the measuring object 1 from the surroundings by a heat insulation 4. A conventional sensor 6 for the temperature measurements is disposed in the measuring chamber 3. Furthermore, the device comprises a housing 8, 9 containing the operating units, supply systems, timers and computer elements, and indicator instruments (not shown). The device is equipped with a convenient handle 10. The device can be calibrated.

An elastic gasket 5 is provided around the opening of the measuring chamber 3 on the measuring surface 2 of the housing. The space 11 is provided to accommodate the electronic unit of the measuring device. This electronic unit, which is merely conventional has a timer controlled by a contact means 7 for the beginning of the measurement and a computer calculating the desired data to be indicated, temperature, temperature in dependence on the time, heat flow, or coefficient of thermal conduction, from the temperature and time measurements and indicating same on one or several indicating instruments 12. A main switch 13 is provided.

The indicating instrument of the measuring device can indicate the measured values as the temperature or the temperature difference, either during a time interval or without such interval, or, with an installed computer, as the heat flow or as the coefficient of thermal conduction.

The measuring device can be equipped with additional temperature sensors which measure temperatures outside of the measuring device that are indicated in the indicating instrument or are taken into consideration in the computer.

The indication of the measured values of the measuring device can be effected for the various values in one instrument or in several instruments.

The measuring system of the measuring device can be constructed so that the measuring volume, as well as the measuring area can be altered in their dimensions and configurations, and the measuring time can be chosen to be different.

The medium in the measuring chamber of the measuring device can be heated up or cooled off for the measuring purpose; it can be gaseous or liquid; and it can be in motion.

The measuring chamber of the measuring device can exhibit a diaphragm as the seal in place of the opening toward the object to be measured.

The measuring step can be triggered in the measuring device by means of an operating knob or switch or by a contact switch upon contacting the object to be measured.

The measuring device can be constructed in such a way that the part with the measuring chamber and the part with the housing containing the other components are movably joined together or are fixedly assembled.

The measured device can be equipped with an implement which presses, seals, and independently retains the entire measuring device or the part with the measuring chamber against the measuring surface of the object to be measured.

What is claimed is:

1. A calorimeter comprising a heat-insulated enclosure having a recess that opens on one side of said enclosure and is adapted to be disposed against a surface whose heat flow is to be measured, a housing outside said enclosure and mounted on the other side of said enclosure for receiving temperature indicating means, and a temperature sensor that is disposed in part in said recess and extends through a side wall of said heat-insulated enclosure and terminates in said housing for said temperature indicating means, and an elastic gasket to seal the heat-insulated enclosure against the surface whose heat flow is to be measured, about the margins of said recess.

* * * * *